(12) United States Patent
Muster (10) Patent No.: US 9,933,058 B1
(45) Date of Patent: Apr. 3, 2018

(54) REDUNDANT EXTENSION LINEAR ACTUATOR AND METHODS OF USE

(71) Applicant: WOODWARD, INC., Fort Collins, CO (US)

(72) Inventor: William F. Muster, Niles, IL (US)

(73) Assignee: WOODWARD, INC., Fort Collins, CO (US)

( * ) Notice: Subject to any disclaimer, the term of this patent is extended or adjusted under 35 U.S.C. 154(b) by 0 days.

(21) Appl. No.: 15/279,722

(22) Filed: Sep. 29, 2016

(51) Int. Cl.
| | |
|---|---|
| *F16H 25/02* | (2006.01) |
| *F16H 25/20* | (2006.01) |
| *F16H 25/22* | (2006.01) |
| *B64C 25/24* | (2006.01) |
| *B64C 25/20* | (2006.01) |

(52) U.S. Cl.
CPC ........... *F16H 25/205* (2013.01); *B64C 25/20* (2013.01); *B64C 25/24* (2013.01); *F16H 25/2015* (2013.01); *F16H 25/2204* (2013.01); *F16H 2025/204* (2013.01)

(58) Field of Classification Search
CPC ........... F16H 2025/2053; F16H 25/205; F16H 25/2006; F16H 25/2018; F16H 25/20; F16H 25/02; F16H 25/08; F16H 25/12

USPC .............. 74/89.29, 89.3, 89.31, 89.26, 89.25
See application file for complete search history.

(56) References Cited

U.S. PATENT DOCUMENTS

| | | | | |
|---|---|---|---|---|
| 4,201,271 A | * | 5/1980 | Evans | B23Q 1/70 173/146 |
| 2015/0308549 A1 | * | 10/2015 | Hirai | F16H 25/205 74/89.29 |

* cited by examiner

*Primary Examiner* — William C Joyce
*Assistant Examiner* — Randell J Krug
(74) *Attorney, Agent, or Firm* — McAndrews, Held & Malloy, Ltd.

(57) ABSTRACT

An actuator having an output slidable between extended and retracted positions is provided. The actuator includes a primary module having a power drive, power screw rotatable by the power drive, and a nut operable to translate rotation of the power screw to linear motion of the nut across the power screw. The actuator includes a secondary module having a power drive, a shaft rotatable by the power drive, a power screw, and a nut. The power screw is slidably coupled to and rotatable by the shaft, and coupled to the output. The nut is coupled to the power screw and is operable to slide linearly across the shaft by rotating through the nut. Both the primary nut and secondary power screw are operable to move the output to the extended position or the retracted position depending on the rotational direction of the primary power screw and secondary power screw.

20 Claims, 9 Drawing Sheets

REDUNDANT EXTENSION LINEAR ACTUATOR AND METHODS OF USE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments of the invention are related to a fail-safe linear actuator configured to extend under reasonably probable failure conditions. More specifically, various embodiments provide a redundant extension linear actuator for a landing gear configuration where means other than gravity are used to achieve a down and locked landing gear condition. Aspects of the present invention provide an electro-mechanical landing gear actuator platform architecture that allows flexibility when designing the kinematics of landing gear mechanisms. The actuator provides a redundant, single, non-rotating output configured to operate with a single locking mechanism and as such, provides discrete position sensing.

BACKGROUND

Actuators are components of machines that convert energy, such as electric current, hydraulic fluid pressure, or the like, into mechanical movement in response to a control signal. Aircraft may use actuators to move aircraft components, such as landing gear. For example, an actuator may extend to move aircraft landing gear to a down and locked landing gear condition and may retract to move the aircraft landing gear to an up and stowed landing gear condition. Aircraft landing gear actuators may be electromechanical, hydro-mechanical, or the like. More recently, electromechanical actuators have been preferred to reduce size and weight of the system, take advantage of electrically-powered aircraft systems, and to avoid maintenance issues, such as fluid leakage, associated with hydraulic systems.

Actuator systems utilized to extend an aircraft landing gear to a down and locked landing gear condition need to be reliable and resistant to failure. Existing actuator systems may employ multiple, independent sub-systems, each having its own extending and retracting output, to provide redundancy in the event that one of the sub-systems jams or otherwise fails. For example, existing redundant actuators may have multiple telescoping output parts or back-to-back (tandem) output parts that extend in opposite directions. These redundant actuator designs typically require separate locking actuators, or may have separate locking mechanisms for each of the output parts complicating the position indication and locking of the actuator. Moreover, back-to-back actuators having output parts that extend in opposite directions from the actuator body typically require special cabling and more space to accommodate the movement of the actuator body. Furthermore, some existing actuator systems have a rotating output element that provides challenges for sealing the actuator. Some existing actuator systems are also unable to operate in various failed free cases, such as if balls of a ball screw are lost, a gear train loses its teeth, or a power screw or nut loses thread.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A redundant extension linear actuator having a single, non-rotating output and methods of using the actuator are provided, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Certain embodiments of the invention may be found in an actuator 100 and redundant methods 200, 300 for linearly extending an exterior slider output 112 of the actuator 100. More specifically, certain embodiments provide a redundant extension linear actuator 100 having a single, non-rotating output 112. The actuator 100 comprises a primary linear module 114, 120, 124, 126, 128 operable to fully extend the single, non-rotating output 112. The actuator 100 comprises a secondary linear module 116, 122, 130, 132, 134 operable to fully extend the single, non-rotating output 112. The primary and secondary linear modules may operate successively or simultaneously. Each of the primary and secondary linear modules is configured to fully extend the exterior slider output 112 if the other module experiences a failed condition.

As used herein, the terms "exemplary" and "example" mean serving as a non-limiting example, instance, or illustration. As used herein, the term "e.g." introduces a list of one or more non-limiting examples, instances, or illustrations.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Although certain embodiments in the foregoing description may be described as operating to move aircraft landing gear to a down and locked landing gear condition, for example, unless so claimed, the scope of various aspects of the present invention should not be limited to aircraft landing gear and may additionally and/or alternatively be applicable to any suitable machine and/or component of a machine.

Figure 1:
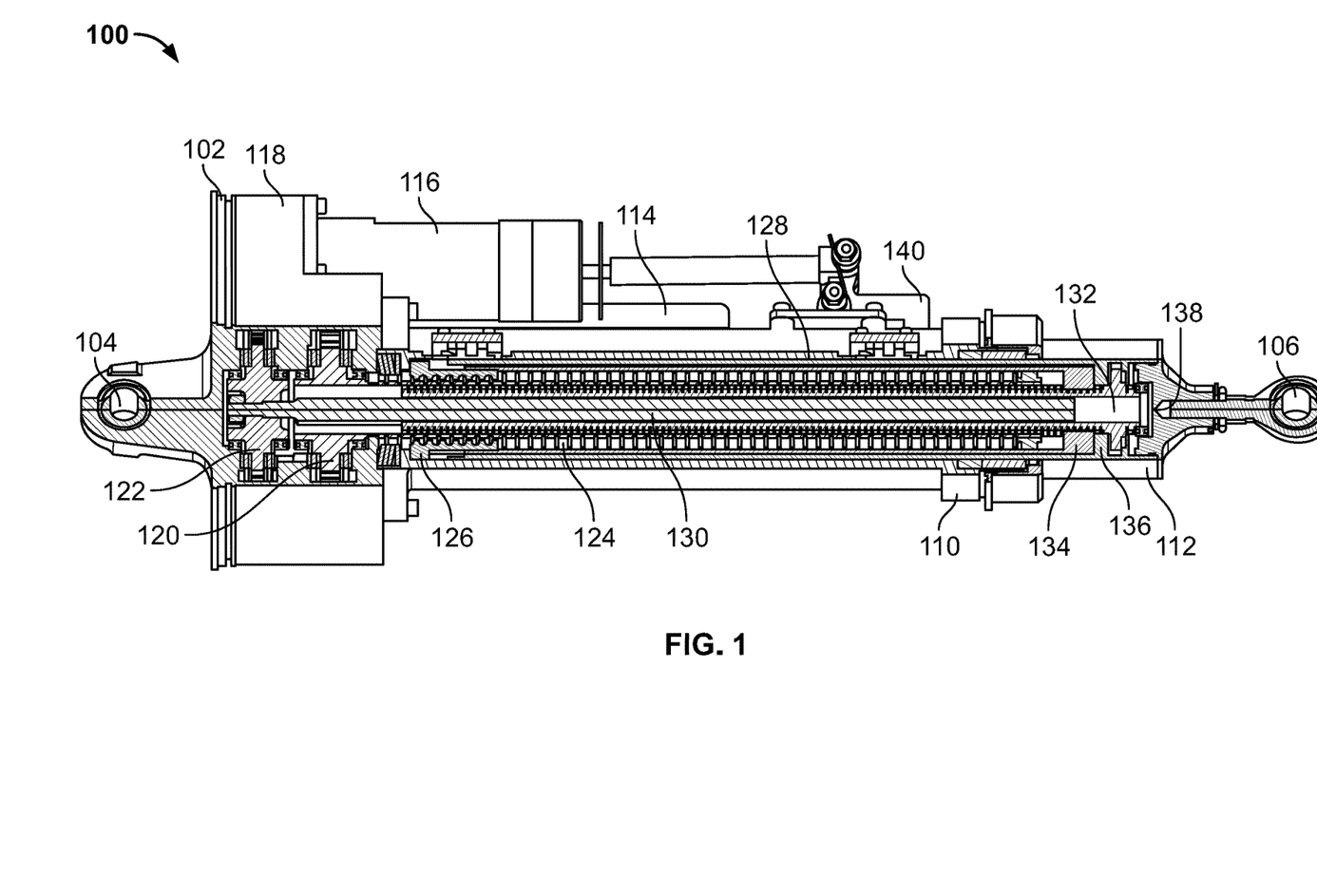
FIG. 1 is a partial cross-sectional view of an exemplary redundant extension linear actuator having a single, exterior slider output in a fully retracted position in accordance with an embodiment of the present invention.
Figure 2:
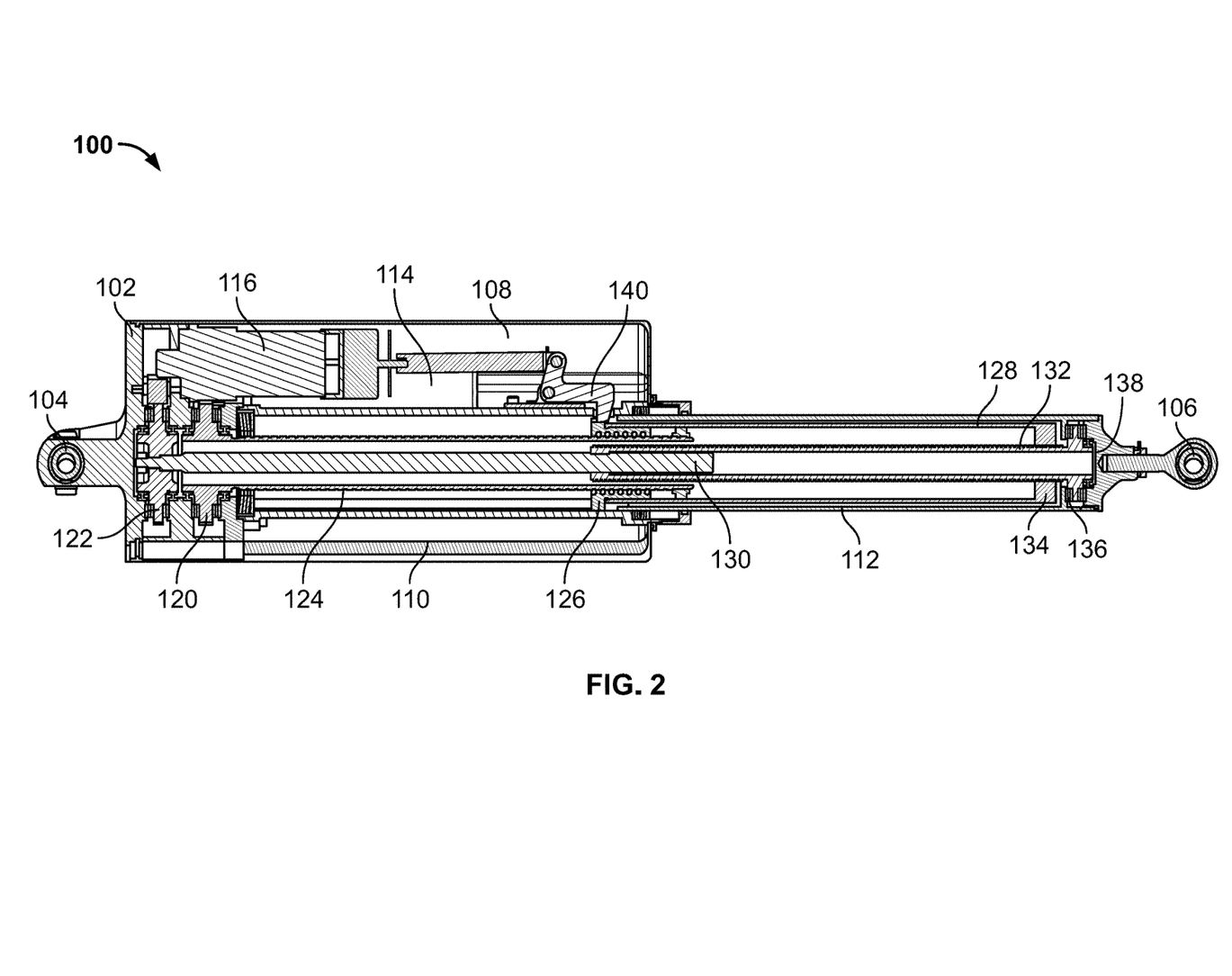
FIG. 2 is a cross-sectional view of an exemplary redundant extension linear actuator having a single, exterior slider output moved to a fully extended position by a primary linear module of the actuator in accordance with an embodiment of the present invention.
Figure 3:
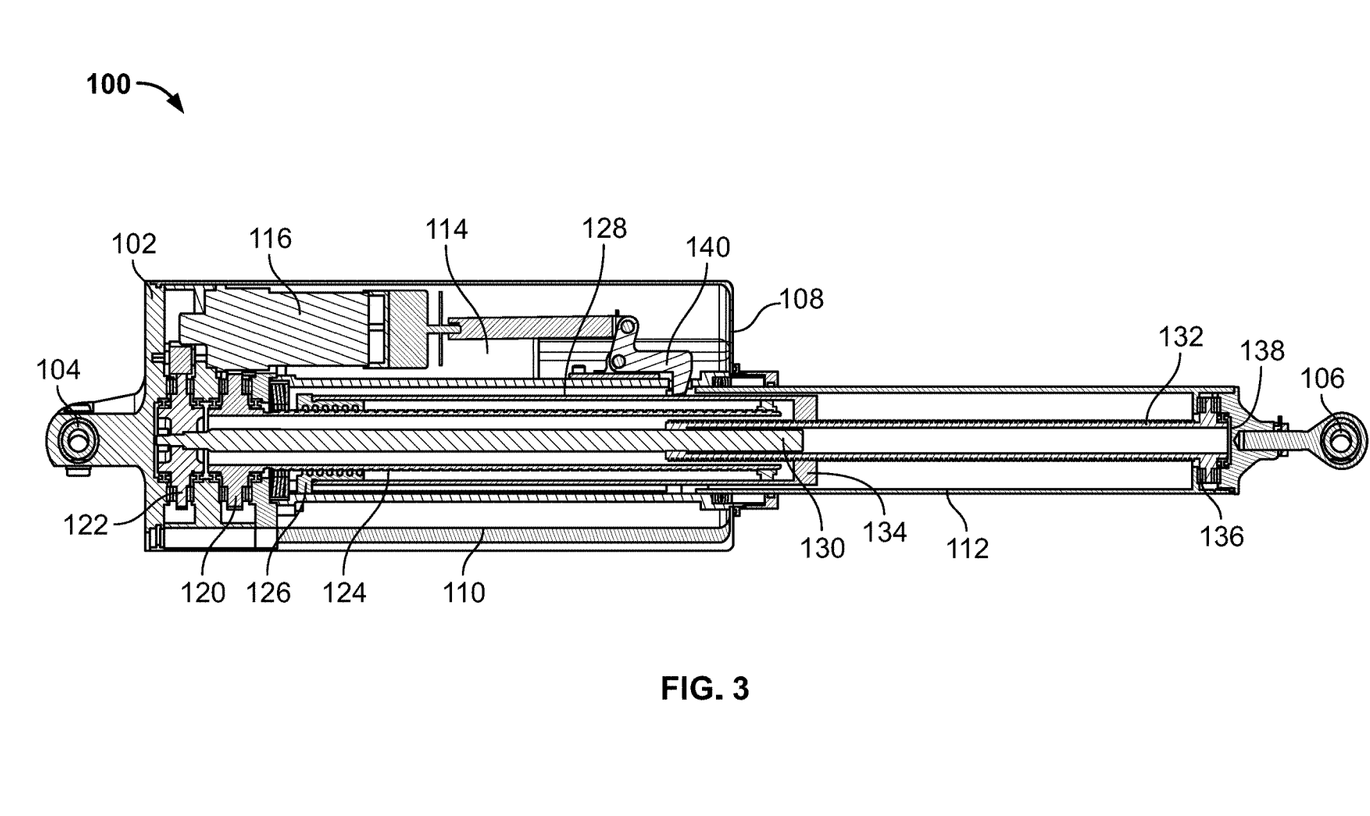
FIG. 3 is a cross-sectional view of an exemplary redundant extension linear actuator having a single, exterior slider output moved to a fully extended position by a secondary linear module of the actuator in accordance with an embodiment of the present invention.

FIG. 1 is a partial cross-sectional view of an exemplary redundant extension linear actuator 100 having a single, exterior slider output 112 in a fully retracted position in accordance with an embodiment of the present invention. FIG. 2 is a cross-sectional view of an exemplary redundant extension linear actuator 100 having a single, exterior slider output 112 moved to a fully extended position by a primary linear module 114, 120, 124, 126, 128 of the actuator 100 in accordance with an embodiment of the present invention. FIG. 3 is a cross-sectional view of an exemplary redundant extension linear actuator 100 having a single, exterior slider output 112 moved to a fully extended position by a secondary linear module 116, 122, 130, 132, 134 of the actuator 100 in accordance with an embodiment of the present invention.

Referring to FIGS. 1-3, the exemplary actuator 100 may comprise a primary linear module, a secondary linear module, and an exterior slider output 112, among other things. The components of the actuator 100 may be coupled to and/or at least partially disposed in a base 102, a cover 108, and/or a linear housing 110. A seal may be provided between the linear housing 110 and the exterior slider output 112. The actuator 100 may comprise attachment interfaces 104, 106, such as spherical bearings (as shown in FIGS. 1-3) or any suitable interface for mounting the actuator 100. For example, the base 102 may comprise an attachment interface 104 at a proximal end of the actuator 100 configured to fixably attach in a stationary position to an airplane. The exterior slider output 112 can include an attachment interface 106 at the distal end of the actuator 100 configured to attach to aircraft landing gear. In various embodiments, linear extension of the exterior slider output 112 moves aircraft landing gear from an up and stowed landing gear condition to a down and locked landing gear condition. Linear retraction of the exterior slider output 112 moves the aircraft landing gear from the down and locked landing gear condition to the up and stowed landing gear condition.

In various embodiments, the primary linear module comprises a primary power drive 114, primary gears 120, a primary power screw 124, a primary nut 126, and an inner slider 128. The primary power drive 114 may be an electric motor, such as a permanent magnetic brush DC motor, or any suitable motor. The primary power drive 114 may be mounted to the base 102 and/or the linear housing 110 and may be disposed within the cover 108. The primary power drive 114 is configured to receive a control signal and in response, is operable to rotate the primary gears 120 in one of a first direction to extend the exterior slider output 112 or a second direction to retract the exterior slider output 112. For example, the control signal may correspond with an activation of a button or switch at an aircraft control panel that corresponds with moving flight landing gear to a down and locked condition or an up and stowed condition.

The primary gears 120 drive the primary power screw 124 to rotate in a direction corresponding with the direction of rotation of the gears 120. The primary gears 120 may be disposed in a gearbox 118. The gearbox 118 may be mounted to the base 102 and/or the linear housing 110 and may be disposed within the cover 108 of the actuator 100. The primary power screw 124 and nut 126 assembly may be a ball screw and ball nut (as shown in FIGS. 1-3) or may be any suitable power screw assembly. The rotation of the primary power screw 124 is translated to linear motion of the nut 126 across the power screw 124. The nut 126 is anti-rotated to the linear housing 110 such that the exterior slider output 112 slides linearly instead of spinning or rotating. In an embodiment, the power screw assembly 124, 126 is disposed in the linear housing 110.

The inner slider 128 is attached at a first proximate end to the primary nut 126 and at a second distal end to a secondary nut 134 of a secondary power screw assembly 132, 134 of the secondary linear module. The secondary power screw 132 interfaces with the exterior slider output 112 as described in more detail below. Accordingly, as the inner slider 128 is slidingly extended or retracted with the linear motion of the primary nut 126, the inner slider 128 pushes or pulls the secondary power screw assembly 132, 134 and correspondingly extends or retracts the exterior slider output 112. In various embodiments, the inner slider 128 is slidably driven by the primary nut 126 within the linear housing 110 and exterior slider output 112. The primary nut 126 may continue moving to an extended position until the position of the exterior slider output 112 triggers engagement of a positive extend lock 140.

In an exemplary embodiment, the secondary linear module comprises a secondary power drive 116, secondary gears 122, a torque shaft 130, a secondary power screw 132, and a secondary nut 134. The secondary power drive 116 may be an electric motor, such as a permanent magnetic brush DC motor, or any suitable motor. The secondary power drive 116 may be mounted to the base 102 and/or the linear housing 110 and may be disposed within the cover 108. The secondary power drive 116 is configured to receive a control signal and in response, is operable to rotate the secondary gears 122 in one of a first direction to extend the exterior slider output 112 or a second direction to retract the exterior slider output 112. For example, the control signal may correspond with an activation of a button or switch at an aircraft control panel that corresponds with moving flight landing gear to a down and locked condition or an up and stowed condition.

The secondary gears 122 drive the torque shaft 130 to rotate in a direction corresponding with the direction of rotation of the gears 122. The secondary gears 122 may be disposed in the gearbox 118. The torque shaft 130 includes an engagement mechanism, such as a spline, square shape, T-shape, hex-shape or any suitable mechanism that allows the shaft 130 to slidably engage and apply torque to a proximal end of the secondary power screw 132. The secondary power screw 132 rotates along the secondary nut 134. The relationship between the secondary power screw 132 and the secondary nut 134 causes the secondary power screw 132 to translate linearly across the torque shaft 130. The secondary power screw 132 and nut 134 assembly may be an Acme screw and Acme nut (as shown in FIGS. 1-3) or may be any suitable power screw assembly. In various embodiments, the secondary power screw 132 is at least partially nested inside the primary power screw 124 and inner slider 128 of the primary linear module such that the primary linear module and secondary linear module form two concentric linear modules.

The distal end of the secondary power screw 132 interfaces with the distal end of the exterior slider output 112. For example, the secondary power screw 132 may be coupled to the exterior slider output 112 at a thrust bearing 136 and radial support bearings 138 at the distal end of the exterior slider output 112. The thrust bearing 136 may allow the secondary power screw 132 to rotate while the exterior slider output 112 is not rotatable. The radial support bearings 138 can center the secondary power screw 132 at the distal end of the exterior slider output 112. The linear translation of the secondary power screw 132 forces the exterior slider output 112 to slide out linearly from the linear housing 110 of the actuator 100. The exterior slider output 112 is anti-rotated to the linear housing 110 such that the exterior slider output 112 slides linearly instead of spinning or rotating. In an embodiment, the secondary power screw assembly 132, 134 is at least partially disposed in the linear housing 110 and the exterior slider output 112. The secondary power screw 132 may continue moving to an extended position until the position of the exterior slider output 112 triggers engagement of a positive extend lock 140.

The positive extend lock 140 prevents an exterior load from back-driving the actuator 100. The positive extend lock 140 may be a stored energy locking system, such as a spring or any suitable mechanism, to automatically lock and remain locked when no power is available. A motor, solenoid, other device, or even manual power may be used to unlock the actuator. The positive extend lock 140 may include a position sensor, such as Hall effect sensors or any suitable position sensing device. The position sensor may provide a signal to an aircraft control panel and/or the power drives 114, 116 when the exterior slider output 112 reaches a fully extended or fully retracted position so that the power drives 114, 116 can be switched off. For example, the exterior slider output 112, or any suitable component of the actuator 100, can comprise one or more magnets that are positioned to correspond with a full extension and/or retraction of the actuator 100. An output voltage of the Hall effect sensors to the aircraft control panel and/or the power drives 114, 116 can be varied to signal that the fully extended or retracted position has been reached so the power drive(s) 114, 116 can be turned off when the Hall effect sensors detect the magnetic field emitted by the magnet(s).

Figure 4:
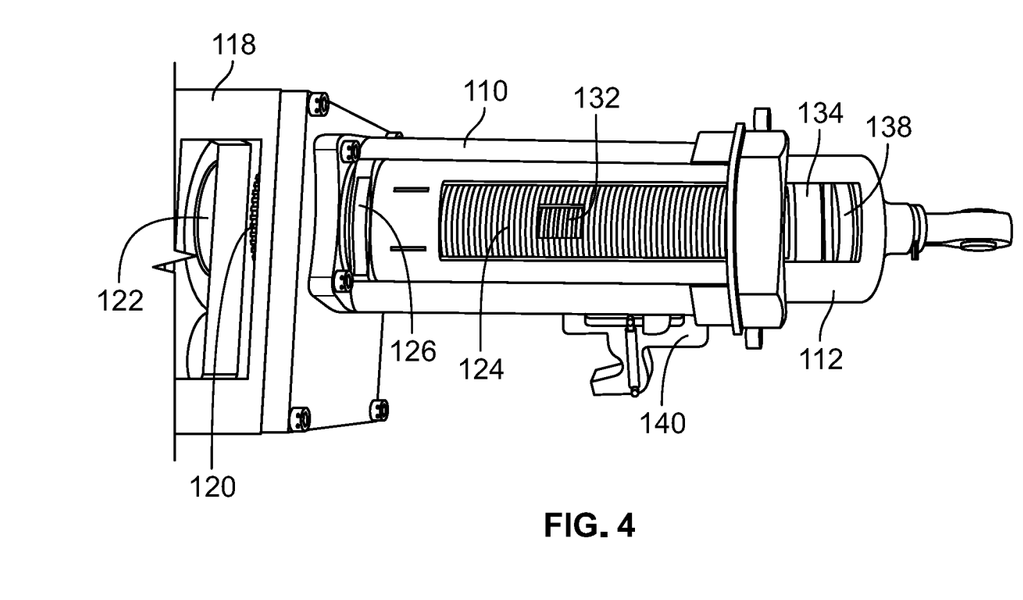
FIG. 4 is a perspective view of a portion of an exemplary redundant extension linear actuator having a single, exterior slider output in a fully retracted position in accordance with an embodiment of the present invention.
Figure 5:
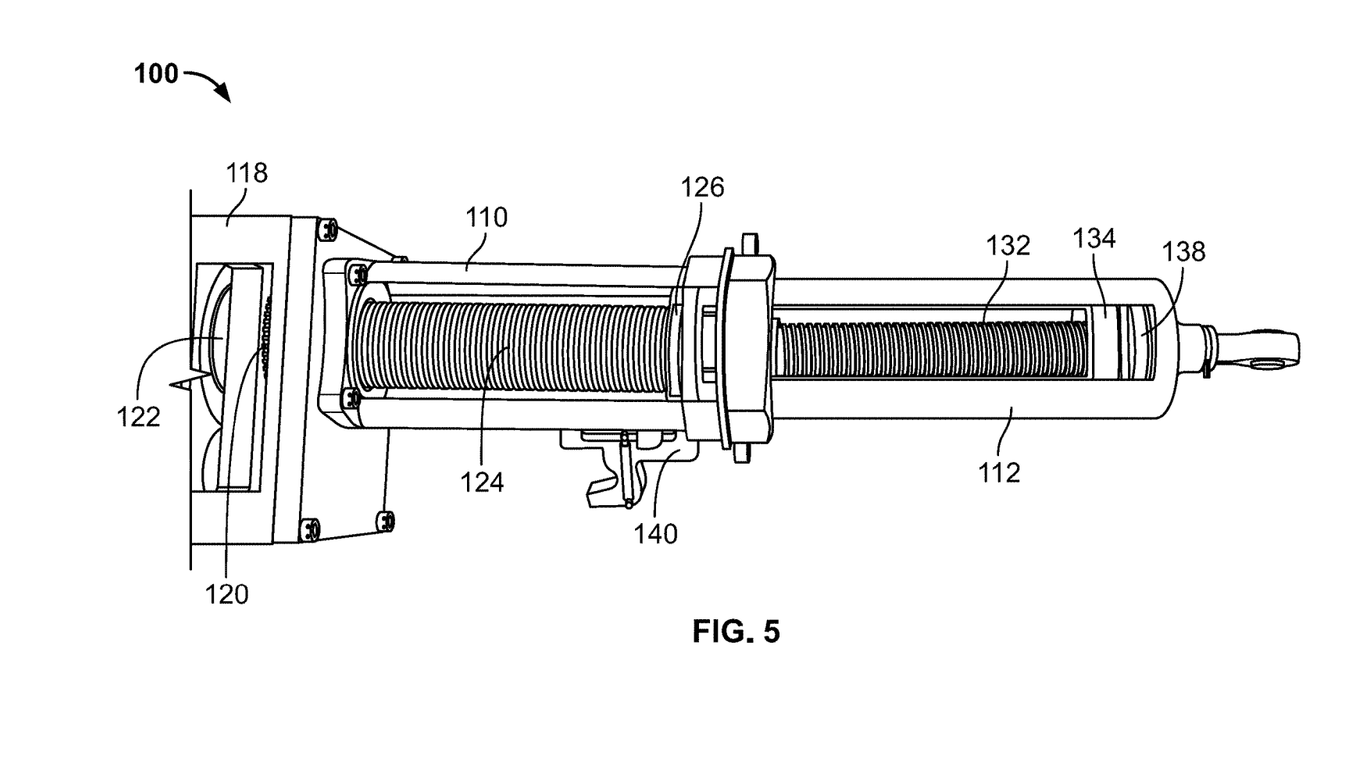
FIG. 5 is a perspective view of a portion of an exemplary redundant extension linear actuator having a single, exterior slider output moved to a fully extended position by a primary linear module of the actuator in accordance with an embodiment of the present invention.
Figure 6:
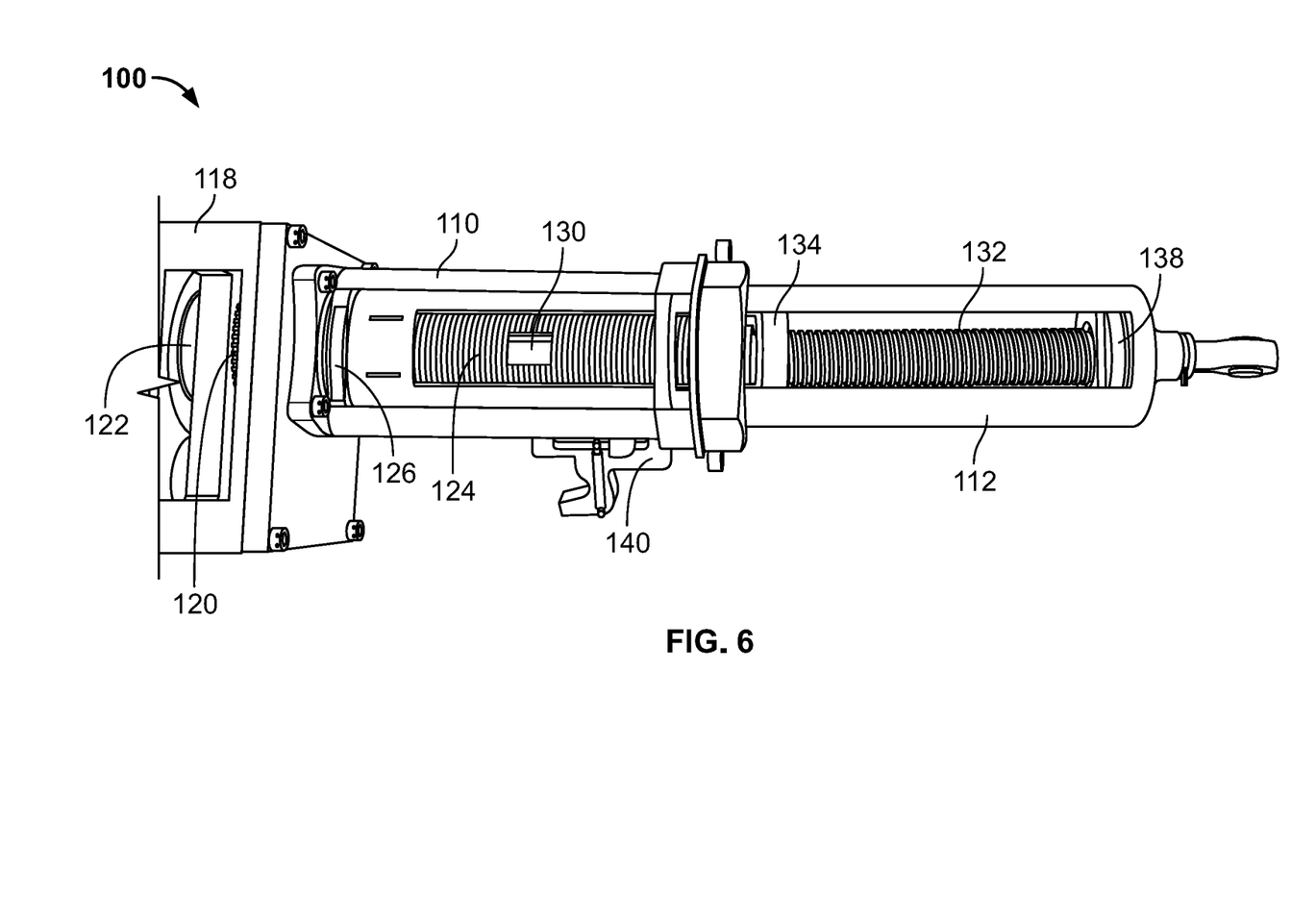
FIG. 6 is a perspective view of a portion of an exemplary redundant extension linear actuator having a single, exterior slider output moved to a fully extended position by a secondary linear module of the actuator in accordance with an embodiment of the present invention.
Figure 7:
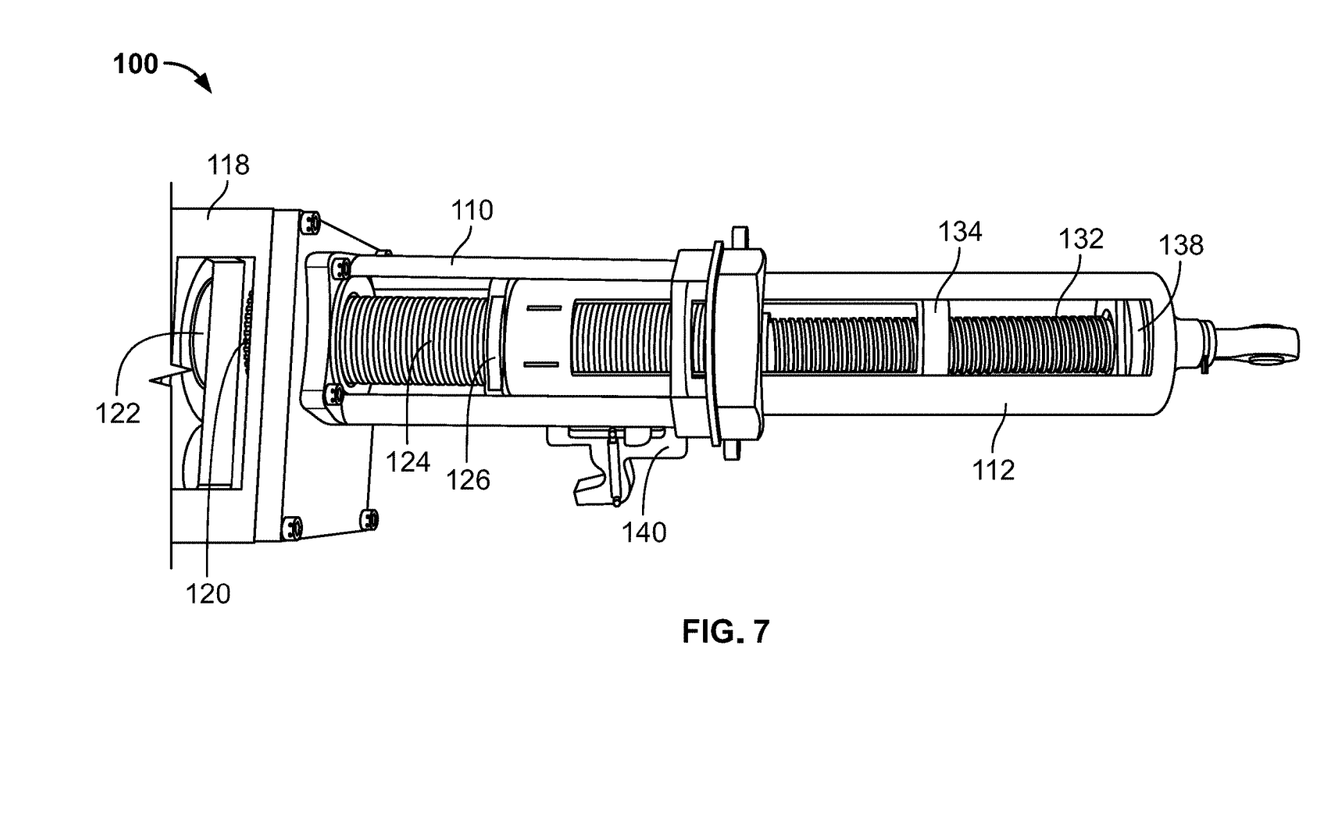
FIG. 7 is a perspective view of a portion of an exemplary redundant extension linear actuator having a single, exterior slider output moved to a fully extended position by both of a primary linear module and a secondary linear module of the actuator in accordance with an embodiment of the present invention.

FIG. 4 is a perspective view of a portion of an exemplary redundant extension linear actuator 100 having a single, exterior slider output 112 in a fully retracted position in accordance with an embodiment of the present invention. FIG. 5 is a perspective view of a portion of an exemplary redundant extension linear actuator 100 having a single, exterior slider output 112 moved to a fully extended position by a primary linear module 114, 120, 124, 126, 128 of the actuator 100 in accordance with an embodiment of the present invention. FIG. 6 is a perspective view of a portion of an exemplary redundant extension linear actuator 100 having a single, exterior slider output 112 moved to a fully extended position by a secondary linear module 116, 122, 130, 132, 134 of the actuator 100 in accordance with an embodiment of the present invention. FIG. 7 is a perspective view of a portion of an exemplary redundant extension linear actuator 100 having a single, exterior slider output 112 moved to a fully extended position by both of a primary linear module 114, 120, 124, 126, 128 and a secondary linear module 116, 122, 130, 132, 134 of the actuator 100 in accordance with an embodiment of the present invention.

The exemplary actuator 100 illustrated in FIGS. 4-7 shares various characteristics with the exemplary actuator 100 illustrated in FIGS. 1-3 as described above. For example, the actuator 100 comprises a linear housing 110 attached to a gearbox 118 and slidably coupled to an exterior slider output 112. Primary 120 and secondary 122 gears are disposed in the gearbox 118 and are operable to drive a primary power screw 124 and a torque shaft 130, respectively, to move an exterior slider output 112 between retracted and extended positions.

As shown in FIGS. 4-5, a primary nut 126 traverses the primary power screw 124 as the primary power screw 124 is rotated by the primary gears 120. The primary nut 126 is attached to an inner slider such that the linear movement of the primary nut 126 correspondingly moves the inner slider. The inner slider is attached to the primary nut 126 at the first end and to a secondary nut 134 at the second end. The secondary nut 134 is on a secondary power screw 132, which is coupled at a distal end to a distal end of the exterior slider output 112. As the primary nut 126 forces the inner slider to slide to an extended position, the secondary nut 134 is linearly moved away from the linear housing 110 while pulling the secondary power screw 132, such that the exterior slider output 112 is pushed from the retracted position illustrated in FIG. 4 to the extended position illustrated in FIG. 5. Once the exterior slider output 112 reaches a fully extended position, a positive extend lock 140 is engaged to provide a positive lock. The exterior slider output 112 may be moved linearly from the extended position shown in FIG. 5 to the retracted position shown in FIG. 4 by rotating the primary gears 120 in an opposite direction and releasing the positive extend lock 140.

Referring to FIGS. 4 and 6, the secondary gears 122 rotate a torque shaft 130 slidably coupled to a proximal end of the secondary power screw 132. The rotation of the torque shaft 130 respectively rotates the secondary power screw 132. The rotation of the secondary power screw 132 within the secondary nut 134 is translated to linear motion of the secondary power screw 132, the secondary power screw 132 sliding across the torque shaft 130 as it moves linearly. The distal end of the secondary power screw 132 is coupled at thrust bearings 136 and radial support bearings 138 to a distal end of the exterior slider output 112. Accordingly, as the secondary power screw 132 moves linearly, the exterior slider output 112 is pushed from the retracted position illustrated in FIG. 4 to the extended position illustrated in FIG. 6. In various embodiments, the distance between the secondary nut 134 and the distal end of the exterior slider output 112 increases as the exterior slider output 112 is extended to a fully extended position, and decreases as the exterior slider output 112 is retracted to a fully retraced position. The positive extend lock 140 engages to provide a positive lock when the exterior slide output 112 reaches a fully extended position. By rotating the secondary gears 122 in an opposite direction and releasing the positive extend lock 140, the exterior slider output 112 may be moved linearly from the extended position shown in FIG. 6 to the retracted position shown in FIG. 4.

In various embodiments, one of the linear modules may be static while the other operates as described above in the context of the primary linear module operating while the secondary linear module is static in FIGS. 4-5, or the secondary linear module operating while the primary linear module is static in FIGS. 4 and 6. In an exemplary embodiment, either module may be fixed or fully back-drivable with the actuator 100 able to fully extend and/or retract with the other module. In this way, either module is operable to extend and/or retract the actuator 100 when the other module fails. Examples of failure conditions in one module that may be overcome by the other module include: (1) when a retract signal is stuck on for one module, (2) a loss of power in one module, such as due to a severed cable harness, (3) a controller failure of one module, (4) a motor failure of one module, (5) a gear train jam in one of the modules, including bearings, (6) a free failure, including loss of teeth in one of the modules, (7) a power screw and nut assembly jam in one of the modules, (8) a power screw and nut assembly free failure, including loss of threads or balls in one of the modules, (9) a loss of irreversibility within one of the modules, and (10) a brake failure of one of the motors.

For example, referring to FIGS. 4 and 7, the primary and secondary modules may operate together, sequentially and/or simultaneously, to move the exterior slider output 112 linearly from a retracted position to an extended position or vice versa. As shown in FIGS. 4 and 7, the primary nut 126 may partially traverse the primary power screw 124 (e.g., approximately halfway) as the primary gears 120 rotate the primary power screw 124. A portion of the secondary power screw 132 may pass through the secondary nut 134 (e.g., about halfway) as the secondary gears 122 rotate the torque shaft 130, which respectively rotates the secondary power screw 132 through the secondary nut 134. In this way, each of the primary linear module and the secondary linear module extend the exterior slider output 112 approximately halfway and further extension is prevented by actuation of the positive extend lock 140. The exterior slider output 112 may be moved linearly from the extended position shown in FIG. 7 to the retracted position shown in FIG. 4 by rotating the primary 120 and secondary 122 gears in an opposite direction and releasing the positive extend lock 140.

Figure 8:
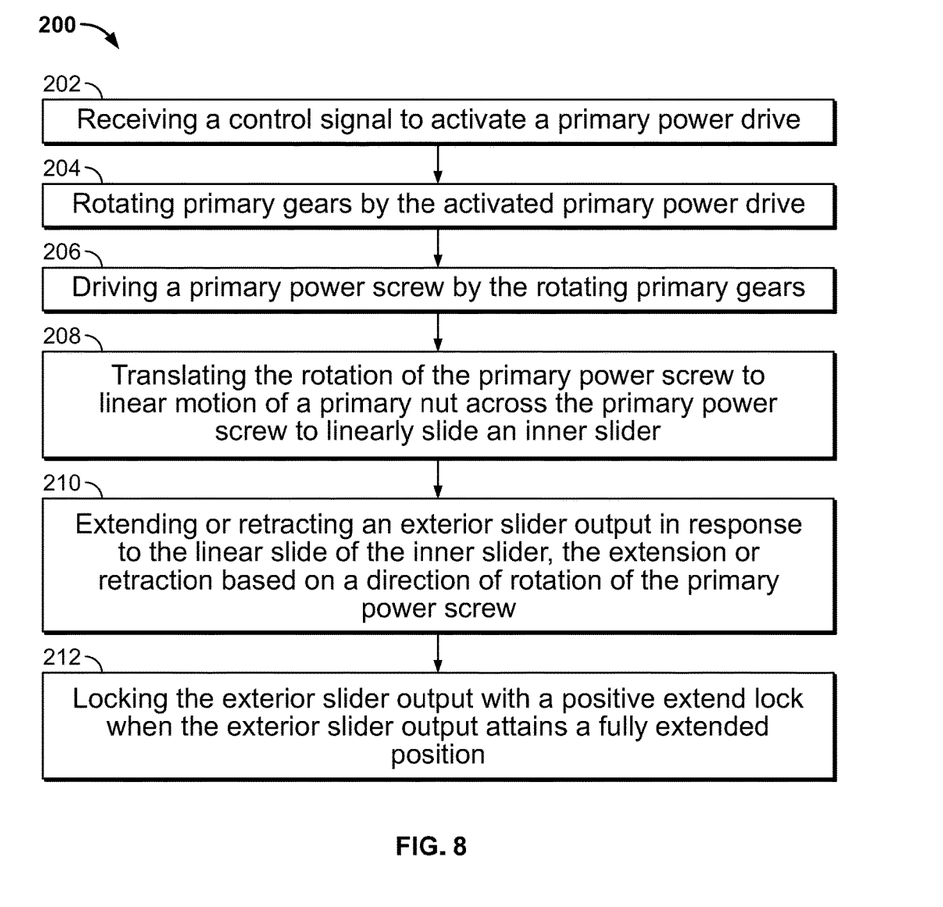
FIG. 8 is a flow diagram that illustrates exemplary steps for extending an exterior slider output via, at least in part, a primary linear module of a redundant extension linear actuator in accordance with an embodiment of the present invention.

FIG. 8 is a flow diagram 200 that illustrates exemplary steps 202-212 for extending an exterior slider output 112 via, at least in part, a primary linear module 114, 120, 124, 126, 128 of a redundant extension linear actuator 100 in accordance with an embodiment of the present invention. Referring to FIG. 8, there is shown a flow chart 200 comprising exemplary steps 202 through 212. Certain embodiments of the present invention may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 202, a control signal for activating a primary power drive 114 is received. For example, a primary power drive 114, which may be an electric motor, such as a permanent magnetic brush DC motor, or any suitable motor, can receive a signal for turning on the motor. In various embodiments, the signal may be from a button or switch at an aircraft control panel that corresponds with moving flight landing gear to a down and locked condition or an up and stowed condition. At step 204, the activated primary power drive 114 rotates primary gears 120. For example, the primary power drive 114 may rotate the gears 120 in a first direction to extend the actuator 100 or rotate the gears 120 in a second direction to retract the actuator 100. At step 206, the rotating primary gears 120 impart rotation to a primary power screw 124. The primary power screw 124 may be a ball screw or any suitable power screw. The primary gears 120 may rotate the primary power screw 124 in a first direction to extend the actuator 100 or rotate the primary power screw 124 in a second direction to retract the actuator 100.

At step 208, the rotation of the primary power screw 124 is translated to linear motion of a primary nut 126 across the primary power screw 124 to linearly slide an inner slider 128 attached to the primary nut 126. The primary power screw 124 and nut 126 assembly may be a ball screw and ball nut or may be any suitable power screw assembly. The nut 126 is attached at one end of the inner slider 128. As the nut 126 moves across the primary power screw 124, the nut 126 pushes or pulls the inner slider 128. In this way, the linear motion of the nut 126 corresponds with linear motion of the inner slider 128.

At step 210, an exterior slider output 112 is extended or retracted in response to the linear slide of the inner slider 128. The extension or retraction is based on a direction of rotation of the primary power screw 124. For example, if the primary power screw 124 rotates in a first direction, the primary nut 126 translates linearly across the primary power screw 124 to push the inner slider 128 and thereby extend the exterior slider output 112. If the primary power screw 124 rotates in a second direction opposite the first direction, the primary nut 126 translates linearly across the primary screw 124 in an opposite direction to pull the inner slider 128 and thereby retract the exterior slider output 112. In various embodiments, the inner slider 128 may be coupled to the exterior slider output 112 via the secondary power screw and nut assembly 132, 134. For example, an end of the inner slider 128, opposite the end attached to the primary nut 126, may be attached to a secondary nut 134. The secondary nut 134 may be coupled to the secondary power screw 132, which interfaces with the exterior slider output 112. Accordingly, pushing or pulling the inner slider 128 respectively pushes or pulls the secondary power screw and nut assembly 132, 134, which correspondingly extends or retracts the exterior slider output 112.

At step 212, the exterior slider output 112 is locked by a positive extend lock 140 when the exterior slider output 112 attains a fully extended position. The positive extend lock 140 prevents an exterior load from back-driving the actuator 100.

Figure 9:
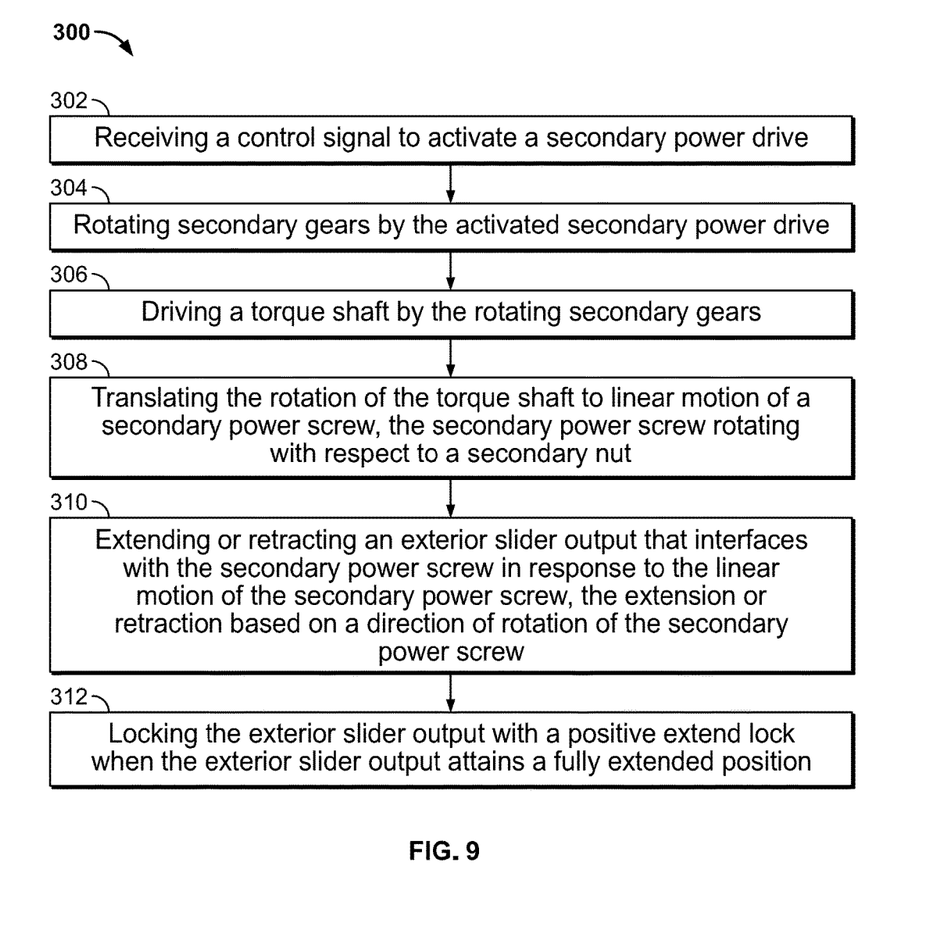
FIG. 9 is a flow diagram that illustrates exemplary steps for extending an exterior slider output via, at least in part, a secondary linear module of a redundant extension linear actuator in accordance with an embodiment of the present invention.

FIG. 9 is a flow diagram 300 that illustrates exemplary steps 302-312 for extending an exterior slider output 112 via, at least in part, a secondary linear module 116, 122, 130, 132, 134 of a redundant extension linear actuator 100 in accordance with an embodiment of the present invention. Referring to FIG. 9, there is shown a flow chart 300 comprising exemplary steps 302 through 312. Certain embodiments of the present invention may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 302, a control signal for activating a secondary power drive 116 is received. For example, a secondary power drive 116, which may be an electric motor, such as a permanent magnetic brush DC motor, or any suitable motor, can receive a signal for turning on the motor. In various embodiments, the signal may be from a button or switch at an aircraft control panel that corresponds with moving flight landing gear to a down and locked condition or an up and stowed condition. At step 304, the activated secondary power drive 116 rotates secondary gears 122. For example, the secondary power drive 116 may rotate the gears 122 in a first direction to extend the actuator 100 or rotate the gears 122 in a second direction to retract the actuator 100. At step 306, the rotating secondary gears 122 drive a torque shaft 130. For example, the secondary gears 122 drive the torque shaft 130 to rotate in a direction corresponding with the direction of rotation of the gears 122.

At step 308, the rotation of the torque shaft 130 is translated to linear motion of a secondary power screw 132 through a secondary nut 134. For example, the torque shaft 130 includes an engagement mechanism, such as a spline, square shape, T-shape, hex-shape or any suitable mechanism that allows the shaft 130 to slidably engage and apply torque to a proximal end of the secondary power screw 132. The secondary power screw 132 rotates along the secondary nut 134. The relationship between the secondary power screw 132 and the secondary nut 134 causes the secondary power screw 132 to translate linearly across the torque shaft 130.

At step 310, an exterior slider output 112 that interfaces with the secondary power screw 132 is extended or retracted in response to the linear motion of the secondary power screw 132. The extension or retraction is based on a direction of rotation of the secondary power screw 132. For example, if the secondary power screw 132 rotates in a first direction, the power screw 132 translates linearly through the secondary nut 134 and across the torque shaft 130 to push the exterior slider output 112 to an extended position. If the secondary power screw 132 rotates in a second direction opposite the first direction, the power screw 132 translates linearly through the secondary nut 134 and across the torque shaft 130 in an opposite direction to pull the exterior slider output 112 to a retracted position. The secondary power screw 132 interfaces with the exterior slider output 112 at, for example, a thrust bearing 136 and radial support bearings 138 at the distal end of the exterior slider output 112. The thrust bearing 136 allow the secondary power screw 132 to rotate without rotating the exterior slider output 112. The radial support bearings 138 center the secondary power screw 132 at the distal end of the exterior slider output 112.

At step 312, the exterior slider output 112 is locked by a positive extend lock 140 when the exterior slider output 112 attains a fully extended position. The positive extend lock 140 prevents an exterior load from back-driving the actuator 100.

Various embodiments provide an actuator 100 comprising a linear housing 110, an exterior slider output 112, a primary linear module, and a secondary linear module. The exterior slider output 112 may be at least partially disposed within the linear housing 110. The exterior slider output 112 may be slidable in a first direction out of the linear housing 110 to an extended position. The exterior slider output 112 may be slidable in a second direction into the linear housing 110 to a retracted position. The primary linear module may comprise a primary power drive 114, a primary power screw 124 rotatable by the primary power drive 114, and a primary nut 126 operable to translate rotation of the primary power screw 124 to linear motion of the primary nut 126 across the primary power screw 124. The primary nut 126 may be operable to move the exterior slider output 112 to the extended position if the primary power screw 124 is rotated in a first primary power screw direction. The primary nut 126 may be operable to move the exterior slider output 112 to the retracted position if the primary power screw 124 is rotated in a second primary power screw direction, opposite the first primary power screw direction. The secondary linear module may comprise a secondary power drive 116, a torque shaft 130, a secondary power screw 132, and a secondary nut 134. The torque shaft may be rotatable by the secondary power drive 116. The secondary power screw 132 may have a first end and a second end. The first end may be slidably coupled to the torque shaft 130 and the second end may be coupled to the exterior slider output 112. The secondary power screw 132 may be rotatable by the torque shaft 130. The secondary nut 134 may be coupled to the secondary power screw 132. The secondary power screw 132 may be operable to slide linearly across the torque shaft 130 by rotating through the secondary nut 134. The secondary power screw 132 may be operable to move the exterior slider output 112 to the extended position if the secondary power screw 132 is rotated in a first secondary power screw direction. The secondary power screw 132 may be operable to move the exterior slider output 112 to the retracted position if the secondary power screw 132 is rotated in a second secondary power screw direction, opposite the first secondary power screw direction.

In certain embodiments, one or both of the first power drive 114 and the second power drive 116 is an electric motor. In a representative embodiment, the electric motor 114, 116 is a permanent magnetic brush DC motor. In various embodiments, the primary power screw 124 is a ball screw and the primary nut 126 is a ball nut. In certain embodiments, the secondary power screw 132 is an Acme screw and the secondary nut 134 is an Acme nut. In a representative embodiment, the exterior slider output 112 is a non-rotatable output of the actuator 100. In various embodiments, the primary power screw 124 is rotatable by the primary power drive 114 via primary gears 120. In certain embodiments, the torque shaft 130 is rotatable by the secondary power drive 116 via secondary gears 122. In a representative embodiment, the torque shaft 130 comprises an engagement mechanism configured to provide the slidable coupling to the first end of the secondary power screw 132. The engagement mechanism may comprise one of a spline, a square shape, a T-shape, or a hex-shape.

In various embodiments, the actuator 100 may comprise a positive extend lock 140 operable to lock the exterior slider output 112 in position if the exterior slider output 112 reaches the extended position. In certain embodiments, the positive extend lock 140 comprises a stored energy locking system to automatically lock the exterior slider output 112 in position. In a representative embodiment, the positive extend lock 140 comprises a position sensor configured to detect a position of the exterior slider output 112. In various embodiments, the position sensor is a Hall effect sensor. In a representative embodiment, the second end of the secondary power screw 132 is coupled to the exterior slider output 112 by one or both of a thrust bearing 138 and a radial support bearing 138. In various embodiments, the thrust bearing 136 is operable to allow the secondary power screw 132 to rotate without rotating the exterior slider output 112. In certain embodiments, the radial support bearing 138 is operable to center the secondary power screw 132 at a distal end of the exterior slider output 112.

In a representative embodiment, the actuator 100 comprises an inner slider 128 having a first end and a second end. The first end of the inner slider 128 is attached to the primary nut 126 and the second end of the inner slider 128 attached to the secondary nut 134. In various embodiments, the secondary power screw 132 is at least partially nested inside the primary power screw 124 and the inner slider 128. In certain embodiments, the primary linear module and the secondary linear module are configured to operate one or both of simultaneously and sequentially. In a representative embodiment, the actuator 100 comprises a plurality of attachment interfaces 104, 106. In various embodiments, one or more of the attachment interfaces 104 is configured to attach the actuator 100 to an aircraft. In certain embodiments, one or more of the attachment interfaces 106 is configured to attach the exterior slider output 112 to a landing gear.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention will include all embodiments falling within the scope of the appended claims.

What is claimed is:

1. An actuator comprising:
    a linear housing;
    an exterior slider output at least partially disposed within the linear housing, the exterior slider output slidable in a first direction out of the linear housing to an extended position, and the exterior slider output slidable in a second direction into the linear housing to a retracted position;
    a primary linear module comprising:
        a primary power drive;
        a primary power screw rotatable by the primary power drive; and
        a primary nut operable to translate rotation of the primary power screw to linear motion of the primary nut across the primary power screw, the primary nut operable to move the exterior slider output to:
            the extended position if the primary power screw is rotated in a first primary power screw direction, and
            the retracted position if the primary power screw is rotated in a second primary power screw direction, opposite the first primary power screw direction; and
    a secondary linear module comprising:
        a secondary power drive;
        a torque shaft rotatable by the secondary power drive;
        a secondary power screw having a first end and a second end, the first end slidably coupled to the torque shaft and the second end coupled to the exterior slider output, the secondary power screw rotatable by the torque shaft; and
        a secondary nut coupled to the secondary power screw, the secondary power screw operable to slide linearly across the torque shaft by rotating through the secondary nut, the secondary power screw operable to move the exterior slider output to:
            the extended position if the secondary power screw is rotated in a first secondary power screw direction, and
            the retracted position if the secondary power screw is rotated in a second secondary power screw direction, opposite the first secondary power screw direction.

2. The actuator according to claim 1, wherein one or both of the primary power drive and the secondary power drive is an electric motor.

3. The actuator according to claim 2, wherein one of both of the electric motors is a permanent magnetic brush DC motor.

4. The actuator according to claim 1, wherein the primary power screw is a ball screw and the primary nut is a ball nut.

5. The actuator according to claim 1, wherein the secondary power screw is an Acme screw and the secondary nut is an Acme nut.

6. The actuator according to claim 1, wherein the exterior slider output is a non-rotatable output of the actuator.

7. The actuator according to claim 1, wherein the primary power screw is rotatable by the primary power drive via primary gears.

8. The actuator according to claim 1, wherein the torque shaft is rotatable by the secondary power drive via secondary gears.

9. The actuator according to claim 1, wherein the torque shaft comprises an engagement mechanism configured to provide the slidable coupling to the first end of the secondary power screw, the engagement mechanism comprising one of a spline, a square shape, a T-shape, or a hex-shape.

10. The actuator according to claim 1, comprising a positive extend lock operable to lock the exterior slider output in position if the exterior slider output reaches the extended position.

11. The actuator according to claim 10, wherein the positive extend lock comprises a stored energy locking system to automatically lock the exterior slider output in position.

12. The actuator according to claim 10, wherein the positive extend lock comprises a position sensor configured to detect a position of the exterior slider output.

13. The actuator according to claim 12, wherein the position sensor is a Hall effect sensor.

14. The actuator according to claim 1, wherein the second end of the secondary power screw is coupled to the exterior slider output by one or both of a thrust bearing and a radial support bearing.

15. The actuator according to claim 14, wherein the thrust bearing is operable to allow the secondary power screw to rotate without rotating the exterior slider output.

16. The actuator according to claim 14, wherein the radial support bearing is operable to center the secondary power screw at a distal end of the exterior slider output.

17. The actuator according to claim 1, comprising an inner slider having a first end and a second end, the first end of the inner slider attached to the primary nut and the second end of the inner slider attached to the secondary nut.

18. The actuator according to claim 17, wherein the secondary power screw is at least partially nested inside the primary power screw and the inner slider.

19. The actuator according to claim 1, wherein the primary linear module and the secondary linear module are configured to operate one or both of simultaneously and sequentially.

20. The actuator according to claim 1, comprising a plurality of attachment interfaces, wherein one or more of the attachment interfaces is configured to attach the actuator to an aircraft, and wherein one or more of the attachment interfaces is configured to attach the exterior slider output to a landing gear.

* * * * *